United States Patent
Nakamura et al.

(10) Patent No.: US 11,375,007 B2
(45) Date of Patent: Jun. 28, 2022

(54) ALLOCATION OF A VIRTUAL NETWORK THAT MINIMIZES THE ELECTRICITY FEE BY USING A POWER CONSUMPTION MODEL

(71) Applicant: Nippon Telegraph and Telephone Corporation, Tokyo (JP)

(72) Inventors: Ryota Nakamura, Musashino (JP); Shigeaki Harada, Musashino (JP); Ken Nishimatsu, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 17/426,392

(22) PCT Filed: Jan. 23, 2020

(86) PCT No.: PCT/JP2020/002394
§ 371 (c)(1),
(2) Date: Jul. 28, 2021

(87) PCT Pub. No.: WO2020/162213
PCT Pub. Date: Aug. 13, 2020

(65) Prior Publication Data
US 2022/0094742 A1  Mar. 24, 2022

(30) Foreign Application Priority Data

Feb. 4, 2019 (JP) .............................. JP2019-017812

(51) Int. Cl.
*G06F 15/173* (2006.01)
*H04L 67/1008* (2022.01)
*H04L 41/0803* (2022.01)

(52) U.S. Cl.
CPC ...... *H04L 67/1008* (2013.01); *H04L 41/0803* (2013.01)

(58) Field of Classification Search
CPC .................... H04L 67/1008; H04L 41/0803
(Continued)

(56) References Cited

U.S. PATENT DOCUMENTS 7,844,839 B2 * 11/2010 Palmer ............... H04L 67/1002
 718/1
8,224,993 B1 * 7/2012 Brandwine ........... G06F 1/3203
 713/320
(Continued)

FOREIGN PATENT DOCUMENTS

WO WO-2013176334 A1 * 11/2013 ............. G06Q 10/06

OTHER PUBLICATIONS

Spitaels, "Dynamic power fluctuations in the data center and server room," APC White Paper #43, 2005, 15 pages (With English Translation).

(Continued)

*Primary Examiner* — Alicia Baturay
(74) *Attorney, Agent, or Firm* — Fish & Richardson P.C.

(57) ABSTRACT

A control apparatus configured to allocate a virtual network for providing a network service on a physical network includes: acquisition means for acquiring information indicating an outside temperature of each node included in the physical network, physical resource information of the physical network, information indicating a predicted traffic amount of the physical network, and an allocation request for the virtual network; and calculation means for calculating an optimal allocation of the virtual network using a target function defined using a unit cost defined for each region and for each time slot and a power consumption model taking into consideration the outside temperature and a load rate calculated based on the predicted traffic amount, and a restrictive condition obtained based on the physical resource information and the allocation request.

15 Claims, 5 Drawing Sheets

(58) Field of Classification Search
USPC .......................................................... 709/223
See application file for complete search history.

(56) References Cited

U.S. PATENT DOCUMENTS

| | | | | |
|---|---|---|---|---|
| 10,334,032 B2* | 6/2019 | Sun | .......................... | H04L 41/16 |
| 10,996,733 B2* | 5/2021 | Lee | .......................... | G06Q 10/04 |
| 2014/0298349 A1* | 10/2014 | Jackson | ................ | G06F 1/3206 |
| | | | | 718/104 |

OTHER PUBLICATIONS

Sugiura, "Power analysis of server room by power visualization," 2014 University ICT Promotion Council Annual Conference Proceedings, Dec. 10, 2014, 11 pages (With English Translation).

Xu et al., "Energy-efficient Virtual Network Function Placement in Telecom Networks," IEEE International Conference on Communications (ICC), May 20, 2018, 7 pages.

\* cited by examiner

ALLOCATION OF A VIRTUAL NETWORK THAT MINIMIZES THE ELECTRICITY FEE BY USING A POWER CONSUMPTION MODEL

CROSS-REFERENCE TO RELATED APPLICATIONS

This application is a National Stage application under 35 U.S.C. § 371 of International Application No. PCT/JP2020/002394, having an International Filing Date of Jan. 23, 2020, which claims priority to Japanese Application Serial No. 2019-017812, filed on Feb. 4, 2019. The disclosure of the prior application is considered part of the disclosure of this application, and is incorporated in its entirety into this application.

TECHNICAL FIELD

The present invention relates to a control apparatus, a control method, and a program.

BACKGROUND ART

A technique called NFV (Network Functions Virtualization) that enables provision of various network services by flexibly combining virtual network functions (VNFs) has been known. These network services are provided by allocating a virtual network (VN) constructed by a service provider to a physical resource held by a telecommunications carrier. Specifically, these network services are provided by allocating a virtual network to each physical resource after satisfying required conditions for each virtual network (e.g., a start point and end point of the virtual network, required bandwidth, allowed delay, etc.), and resource restrictive conditions of a physical network (e.g., link bandwidth, server capacity, etc.).

Incidentally, reduction of OPEX (Operating Expense) has been an important issue for telecommunications carriers from the viewpoint of continuing service. The electricity fee for running a server or air conditioning for cooling these elements takes up a large weight in the OPEX, and thus there has been strong demand for reduction of the electricity fee. In contrast to this, a virtual network control method that minimizes power consumption in order to reduce the OPEX has been proposed. For example, a communication route control method has been proposed in which power consumption of a server and a link is modeled and the power consumption is minimized (NPL 1).

On the other hand, for example, it is known that a server or a device in a data center has power consumption that varies according to a load rate (NPL 2). Also, for example, it is known that due to the fact that the power consumption of an air conditioner is closely related to the outside temperature, power consumption of a data center also depends on the outside temperature (NPL 3).

CITATION LIST

Patent Literature

[NPL 1] Zhichao Xu, Xiaoning Zhang, Shui Yu, Ji Zhang, "Energy-efficient Virtual Network Function Placement in Telecom Networks", 2018 IEEE International Conference on Communications (ICC)
[NPL 2] Jim Spitaels, "Dynamic Power Variations in Data Centers and Network Rooms", APC White Paper #43
[NPL 3] T. Sugiura, "Server room power analysis through power visualization", 2014 ARIES

SUMMARY OF THE INVENTION

Technical Problem

However, for example, in the method disclosed in NPL 1, no consideration was given to the outside temperature and the load rate, and the power consumption estimation accuracy was low.

Also, although the electricity fee is calculated as the product of the power consumption and the electricity fee unit cost, the electricity fee unit cost differs also depending on the region (i.e., the administration area of the power company) and the time slot. For this reason, for example, even if allocation of a virtual network with the smallest electricity fee in a certain time slot was performed, the electricity fee was not necessarily the smallest in another time slot.

The present invention was made in view of the above-described points, and aims to realize allocation of a virtual network in which cost is minimized.

Means for Solving the Problem

In order to achieve the above-described object, a control apparatus according to an embodiment of the present invention is a control apparatus configured to allocate a virtual network for providing a network service on a physical network, including: acquisition means for acquiring information indicating an outside temperature of each node included in the physical network, physical resource information of the physical network, information indicating a predicted traffic amount of the physical network, and an allocation request for the virtual network; and calculation means for calculating an optimal allocation of the virtual network using a target function defined using a unit cost defined for each region and for each time slot and a power consumption model taking into consideration the outside temperature and a load rate calculated based on the predicted traffic amount, and a restrictive condition obtained based on the physical resource information and the allocation request.

Effects of the Invention

Allocation of a virtual network that minimizes cost can be realized.

DESCRIPTION OF EMBODIMENTS

Hereinafter, an embodiment of the present invention will be described with reference to the drawings. In an embodiment of the present invention, a case will be described in which the electricity fee is envisioned as an example of cost, and when a virtual network (hereinafter also referred to simply as "VN") is allocated to a physical resource, the allocation of the virtual network is realized such that the electricity fee is minimized, with consideration given also to the outside temperature, the load rate, the time slot, and the region (administration area of the power company).

In view of this, in an embodiment of the present invention, power consumption models that take into consideration the outside temperature and the load rate (a power consumption model of a data center and a power consumption model of a link) are defined, and a target function is formulated in which the total cost (i.e., the electricity fee) is calculated by multiplying an electricity fee unit cost taking into consideration the time slot by the power consumption calculated using these power consumption models. Then, VN allocation is calculated such that this target function is minimized. Note that allocating the VN to a physical resource may also be realized as, for example, "embedding the VN in a physical resource", "arranging the VN in a physical resource", or the like.

Figure 1:
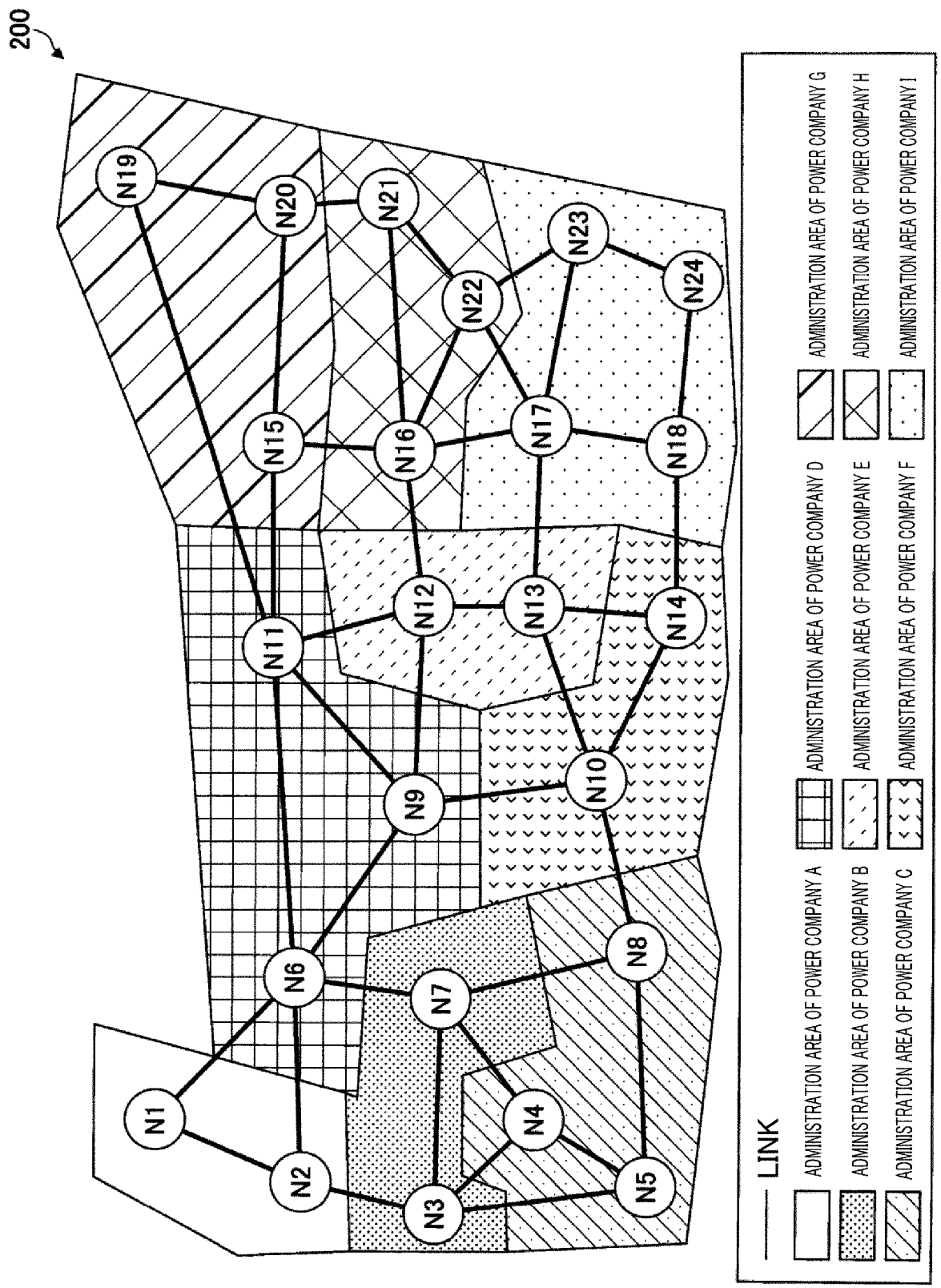
FIG. 1 is a diagram for illustrating an example of a relationship between a physical network and administration areas of power companies.

Relationship Between Physical Network 200 and Administration Area of Power Company First, the relationship between the physical network 200 and administration areas of power companies will be described with reference to FIG. 1. FIG. 1 is a diagram for illustrating an example of a relationship between the physical network 200 and administration areas of power companies.

As shown in FIG. 1, the physical network 200 is constituted by nodes N1 to N24 and links connecting the nodes. Also, the administration areas of power companies A to I are shown in FIG. 1. Note that the nodes N1 to N24 are, for example, data centers in which servers, various communication devices, and the like are arranged. Hereinafter, it is assumed that the nodes of the physical network 200 are data centers.

Here, for example, if it is assumed that the electricity fee unit costs of all of the power companies are the same and the node 16 is to be accessed from the node N8, the optimal route is node N8→node N10→node 13→node N12→node N16. However, if, for example, the electrical fee unit cost of the power company E is higher than that of the other power companies, it is envisioned that a route bypassing the administration area of the power company E, such as node N8→node N10→node N14→node N18→node N17→node N16, is the optimal route. Also, if a network service is to be provided through this access, it is preferable that a VN is arranged in the data center of the node N12 or the node N13 with consideration given to centrality (the position at which the sum of distances with respect to all of the service provision destinations is small). However, from the viewpoint of the electricity fee, it is envisioned that cost merit appears due to arranging the VN in the node N16 or the node N17.

In this manner, due to the electricity fee unit cost being different depending on the area, the optimal VN allocation pattern taking into consideration the electricity fee (i.e., the allocation pattern used when allocating the VN to the physical resource) changes. Also, as will be described later, since the electricity fee unit cost differs according to the time slot, the optimal VN allocation pattern changes also depending on the time slot.

Relationship Between Time Slot and Electricity Fee Unit Cost

Figure 2:
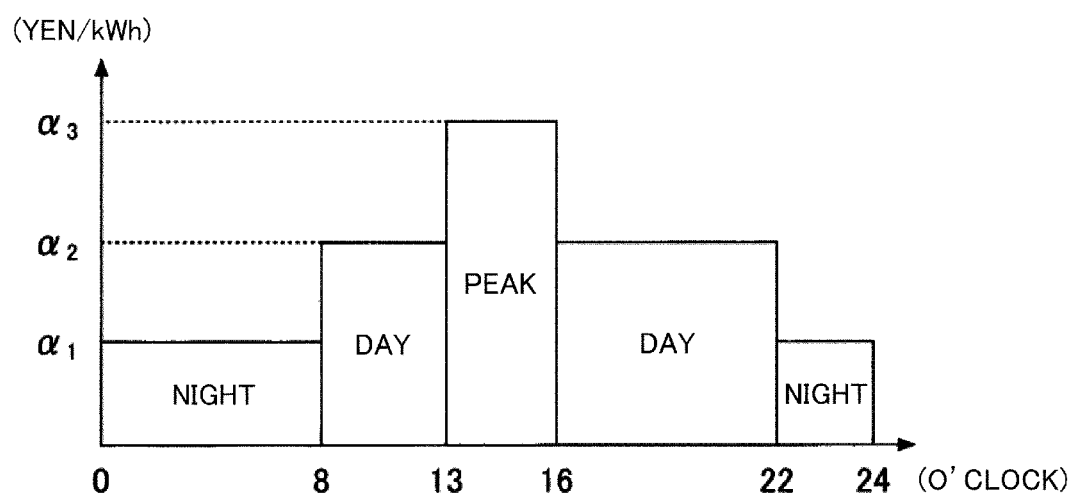
FIG. 2 is a diagram for illustrating an example of a relationship between a time slot and an electricity fee unit cost.

Here, the relationship between the time slot and the electricity fee unit cost will be described with reference to FIG. 2. FIG. 2 is a diagram for illustrating an example of a relationship between time slots and an electricity fee unit cost.

FIG. 2 shows an example of electricity fee unit costs of a certain power company. As shown in FIG. 2, in general, the electricity fee unit cost differs depending on the time slot. In the example shown in FIG. 2, in the night time slots (0:00 to 8:00, 22:00 to 24:00), the electricity fee unit cost is $\alpha_1$, in the day time slots (8:00 to 13:00, 16:00 to 22:00), the electricity fee unit cost is $\alpha_2$, and in the peak time slot (13:00 to 16:00), the electricity fee unit cost is $\alpha_3$.

In this manner, the electricity fee unit cost generally differs according to the time slot. However, the example shown in FIG. 2 is an example, and depending on the power company, a case is also possible in which the electricity fee unit cost is uniform regardless of the time slot, and a case is also possible in which the time slots are divided more finely than in the example shown in FIG. 2.

Formulation of Target Function

Next, in a physical network 200 in which the electricity fee unit cost differs depending on the region (administration area of power company) and the time slot, a target function for calculating the VN allocation according to which the electricity fee is the least expensive is formulated.

First, a power consumption model $P_{DCi}$ of an i-th data center and a power consumption model $P_{Linkj}$ of a j-th link are defined by functions f and g as in the following formulas (1) and (2).

$$P_{DCi} = f_i(t_i, l_i) \quad (1)$$

$$P_{Linkj} = g_j(t_j, b_j) \quad (2)$$

Herein, $t_i$ indicates the outside temperature (° C.) at the location of the i-th data center, $l_i$ indicates the overall load rate (%) of the i-th data center, and $b_j$ indicates the load rate of the j-th link.

It is thought that the outside temperature and the power consumption are in an exponential relationship. Also, even if the load rate is zero, idle power, standby power, power for an air conditioner for continuously cooling the server, and the like are needed, and therefore the power consumption is not zero. In consideration of this, the following formula (3) is an example of the power consumption model $P_{DCi}$ of the data center.

$$P_{DCi} = e^{D_i(t_i - 20)} \times [f_i(20, 0) + \{f_i(20, 100) - f_i(20, 0)\} \times l_i / 100] \quad (3)$$

Here, e is the base of a natural logarithm, $D_i$ is a constant that is determined in advance for each data center, $f_i(20, 0)$ indicates the power consumption of the i-th data center when the outside temperature is 20° C. and the load rate is 0%, and $f_i(20, 100)$ indicates the power consumption of the i-th data center when the outside temperature is 20° C. and the load rate is 100%.

The following formula (4) is also similarly an example of the power consumption model $P_{Linkj}$ of the link.

$$P_{Linkj} = e^{D_j(t_j - 20)} \times [g_j(20, 0) + \{g_j(20, 100) - g_j(20, 0)\} \times b_j / 100] \quad (4)$$

Here, $g_j(20, 0)$ indicates the power consumption of the j-th link when the outside temperature is 20° C. and the load rate is 0%, and $g_j(20, 100)$ indicates the power consumption of the j-th link when the outside temperature is 20° C. and the load rate is 100%.

The constants $D_i$ and $D_j$ of the above-described formulas (3) and (4) need only be derived using regression analysis or the like based on, for example, the actual measured data of the power consumption, the load rate, and the outside temperature.

Next, CPU (Central Processing Unit) demand that is needed in the a-th VN is defined as $C_{VNa}$, the CPU capacity of the i-th data center is defined as $C_{imax}$, and the j-th link bandwidth is defined as $C_{jmax}$. At this time, $l_i$ and $b_j$ can be expressed using the following formulas (5) and (6).

$$l_i = \frac{\sum_{a \in i} C_{VNa}}{C_{imax}} \quad (5)$$

$$b_j = \frac{\sum_{a \in j} C_{VNa}}{C_{jmax}} \quad (6)$$

The numerator on the right side of formula (5) above indicates the total amount of CPU demand of all VNs allocated to the i-th data center. Similarly, the numerator on the right side of formula (6) indicates the bandwidth of all of the VNs allocated to the j-th link.

Also, since VNs cannot be allocated exceeding the CPU capacities of the data centers and the link bandwidths of the links, the restrictive conditions shown in formula (7) and formula (8) below are obtained.

$$\sum_{a \in i} C_{VNa} \leq C_{imax} \quad (7)$$

$$\sum_{a \in j} C_{VNa} \leq C_{jmax} \quad (8)$$

According to the above description, it is possible to formulate a target function h shown in the following formula (9).

$$h = \Sigma P_{DCi} \times F_{Ti} + \Sigma P_{Linkj} \times F_{Tj} \quad (9)$$

Here, $F_{Ti}$ indicates the electricity fee unit cost at the i-th data center at a time T, and $F_{Tj}$ indicates the electricity fee unit cost at the j-th link at a time T. Also, the first term of the target function h shown in formula (9) above indicates the electricity fee of all of the data centers on a route (i.e., a route connecting the start point and the end point of a VN), and the second term indicates the electricity fee of all of the links on the route.

Accordingly, the restrictive conditions shown in formula (7) and formula (8) above are satisfied, and it is possible to realize VN allocation that minimizes cost (i.e., the electricity fee) by calculating a VN allocation pattern (i.e., a route connecting the start point and the end point of each VN) that minimizes the target function h shown in formula (9) above. Note that, for example, in the case of service function chaining in which a firewall (FW), an intrusion detection system (IDS), and the like are arranged on the route, in addition to the route, it is possible to also calculate which data center is to be provided with the functions such as FW and IDS.

Note that the restrictive conditions shown in formulas (7) and (8) above are the CPU capacities of the data centers and the link bandwidths of the links, but in addition to this, it is also conceivable that the following restrictive conditions are also used according to the required quality and the like of the network services to be provided by the VN.

Not exceeding the line capacity of the links

Delay time not exceeding a determined upper limit value

Each VN being allocated to one physical machine (i.e., the VNs being inseparable)

Not exceeding a contract electrical power of the data centers

Here, although the target function h shown in the above-described formula (9) can be applied also in the case of a normal state in which the load value and the outside temperature do not change (i.e., a case in which $t_i$, $l_i$, and $b_j$ are constants), the target function h can be applied also in the case where $t_i$, $l_i$, and $b_j$ change over time (i.e., a case in which $t_i$, $l_i$, and $b_j$ are variables). By setting $t_i$, $l_i$, and $b_j$ as variables, the optimal VN allocation pattern for each time can be calculated with consideration given to temporal change in all of the outside temperature, load rate (i.e., traffic amount), and electricity fee unit cost. Note that, for example, data acquired from a weather information service or the like can be used as the outside temperature $t_i$, and the load rates $l_i$ and $b_j$ can be calculated based on traffic amounts predicted using a known traffic prediction technique. A traffic prediction technique is, for example, a technique of predicting a future traffic amount based on a past traffic amount using a method such as machine learning. Here, as the prediction method, for example, any method can be applied as long as it is a chronological prediction method, such as the ARIMA model, or LSTM (Long Short-Term Memory). Regarding the ARIMA model, for example, it is possible to use a method described in "Feng, Huifang, and Yantai Shu. "Study on network traffic prediction techniques.", Wireless Communications, Networking and Mobile Computing, 2005. Proceedings. 2005 International Conference on. Vol. 2. IEEE, 2005." or the like. Also, regarding LSTM, for example, it is possible to use a method described in "Hochreiter, Sepp, and Jurgan Schmidhuber. "Long short-term memory.", Neural computation 9.8 (1997): 1735-1780." or the like.

Hereinafter, a network control apparatus 100 will be described in which optimal VN allocation is realized by calculating a VN allocation pattern that minimizes the target function h shown in formula (9) above while satisfying the restrictive conditions shown in formulas (7) and (8) above.

Functional Configuration of Network Control Apparatus 100

Figure 3:
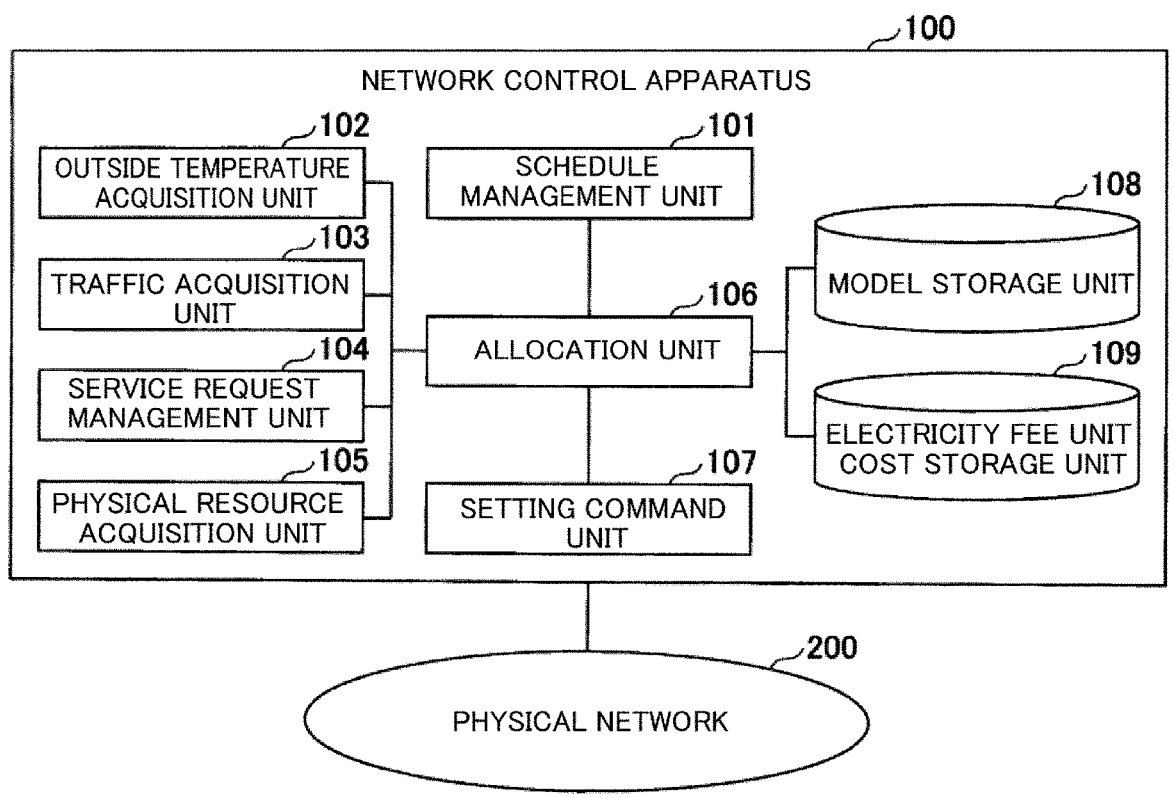
FIG. 3 is a diagram showing an example of a functional configuration of a network control apparatus according to an embodiment of the present invention.

Next, a functional configuration of the network control apparatus 100 according to an embodiment of the present invention will be described with reference to FIG. 3. FIG. 3 is a diagram showing an example of a functional configuration of the network control apparatus 100 according to an embodiment of the present invention.

As shown in FIG. 3, the network control apparatus 100 according to an embodiment of the present invention includes, as functional units, a schedule management unit 101, an outside temperature acquisition unit 102, a traffic acquisition unit 103, a service request management unit 104, a physical resource acquisition unit 105, an allocation unit 106, and a setting command unit 107. Also, the network control apparatus 100 according to an embodiment of the present invention includes, as storage units, a model storage unit 108 and an electricity fee unit cost storage unit 109.

The model storage unit 108 stores power consumption models (i.e., the power consumption models shown in formulas (1) and (2) above). The electricity fee unit cost storage unit 109 stores the electricity fee unit cost for each time span in each region. Note that the electricity fee unit cost is updated each time the electricity fee unit cost is changed, such as an electricity fee unit cost revision of the power company, a contract change with the power company, a change to another power company, or the like, for example.

The schedule management unit 101 manages a schedule (i.e., a VN allocation execution condition) of executing processing (VN allocation processing) for calculating the optimal VN allocation pattern and allocating the VN of this allocation pattern to physical resources. Here, examples of VN allocation execution conditions include "elapse of a predetermined time interval from the previous execution time", and "traffic amount increasing to a certain threshold value or more".

The outside temperature acquisition unit 102 acquires information indicating the outside temperature at the location of each data center (hereinafter also referred to as "outside temperature information"). Here, for example, the outside temperature information may also be acquired from a weather information service or the like, or if an outside temperature sensor or the like is arranged at each data center, the outside temperature information may also be acquired from the outside air sensor.

The traffic acquisition unit 103 acquires the traffic amount (i.e., the predicted traffic amount) in the time of performing VN allocation. This kind of traffic amount is predicted using a traffic prediction technique, as described above. Note that the traffic acquisition unit 103 may also acquire a traffic amount predicted using another apparatus that is connected via the network control apparatus 100 and a network, and may also acquire a traffic amount predicted by the network control apparatus 100.

The service request management unit 104 manages service requests. A service request is a VN allocation request from a service provider. A service request includes VN request conditions (e.g., start point and end point of the VN, required bandwidth, allowable delay, etc.). These service requests are held in a storage apparatus or the like of the network control apparatus 100, for example.

The physical resource acquisition unit 105 manages information relating to physical resources (e.g., the CPU capacity of each data center, link bandwidth of each link, etc.). The information relating to these physical resources is stored in, for example, a storage apparatus or the like of the network control apparatus 100.

The allocation unit 106 calculates an optimal VN allocation pattern using the target function h shown in formula (9) above according to an instruction from the schedule management unit 101. That is, the allocation unit 106 first creates restrictive conditions using the service request and the information relating to the physical resources. Then, the allocation unit 106 calculates the optimal VN allocation pattern using the power consumption models, the electricity unit cost for each region and each time slot, the outside temperature, and the load rates. Note that the load rate is calculated based on, for example, a predicted traffic amount and a CPU capacity (or link bandwidth).

The setting command unit 107 transmits a VN setting command to each physical resource (e.g., a server, various communication devices, etc.) so as to realize the optimal VN allocation pattern calculated by the allocation unit 106. Accordingly, the optimal VN allocation is realized.

VN Allocation Processing

Figure 4:
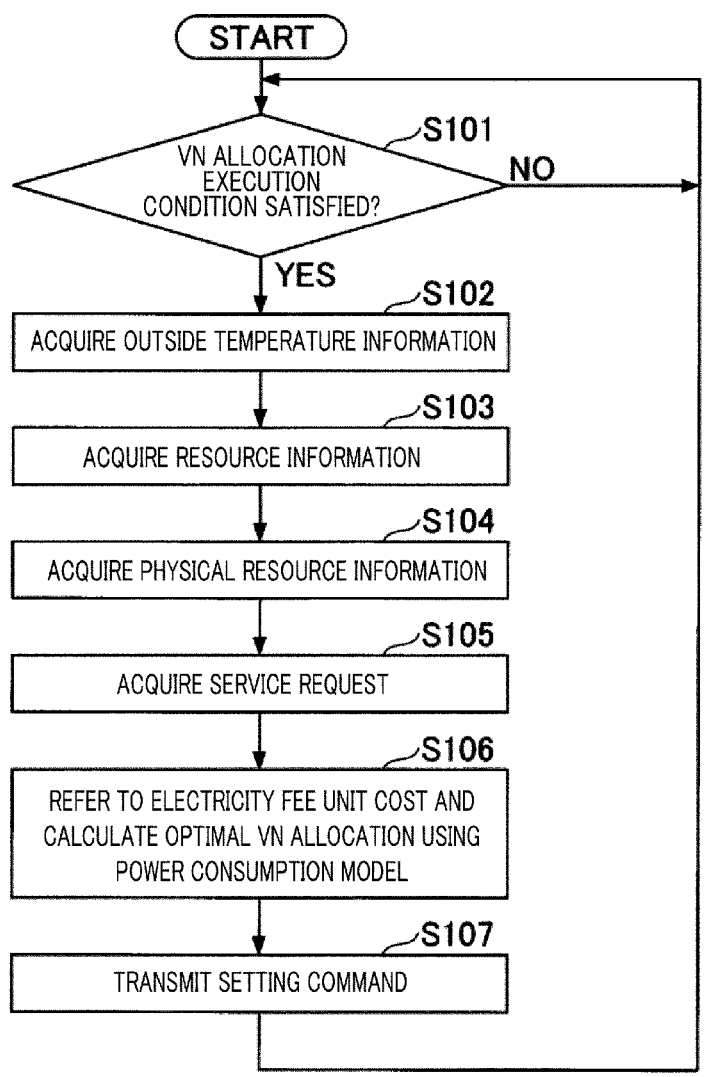
FIG. 4 is a flowchart showing an example of VN allocation processing according to an embodiment of the present invention.

Next, VN allocation processing according to an embodiment of the present invention will be described with reference to FIG. 4. FIG. 4 is a flowchart showing an example of VN allocation processing according to an embodiment of the present invention.

Step S101: First, the schedule management unit 101 determines whether or not the VN allocation execution conditions have been satisfied. As described above, examples of VN allocation execution conditions include "elapse of a predetermined time interval from the previous execution time", and "traffic amount increasing to a certain threshold value or more". If it is determined that the VN allocation execution conditions have been satisfied, the VN allocation processing according to an embodiment of the present invention proceeds to step S102.

Here, the following can be said about a case in which the above-described "case in which the traffic amount has increased to a certain threshold value or more" is used as the VS allocation execution condition. A one-day operation plan (i.e., a plan of how to perform VN allocation) is formulated based on the traffic amount predicted using the traffic prediction technique, and if an unexpected increase in traffic that exceeds a certain predetermined threshold value occurs, VN allocation can be performed.

Note that, for example, if "elapse of a predetermined time interval from previous execution time" is set as the VN allocation execution condition, the electricity fee is often generally added every 30 minutes, and therefore it is thought that the predetermined time interval (this time interval is also indicated as "control interval") is set to 30 minutes.

On the other hand, if the control interval is set to 30 minutes or more, the electricity fee unit cost changes during a control interval in some cases. In view of this, in such a case, the time average of the electricity fee unit cost need only be used with the target function h shown in formula (9) above. For example, if the electricity fee unit cost changes during a control interval $T_1 \sim T_2$, the time average unit cost $F_{avr\ k}$ at the k-th data center (or link) need only be defined as formula (10) below, and $F_{avr\ i}$ and $F_{avr\ j}$ need only be used instead of $F_{Ti}$ and $F_{Tj}$ in the target function h shown in formula (9) above.

$$F_{avrk} = \frac{1}{T_2 - T_1} \int_{T_1}^{T_2} F_{Tk} dT \qquad (10)$$

Accordingly, even if the electricity fee unit cost changes during a control interval $T_1 \sim T_2$, it is possible to calculate the optimal VN allocation pattern with a high accuracy.

Step S102: The outside temperature acquisition unit 102 acquires outside temperature information indicating the outside temperature at the location of each data center.

Step S103: The traffic acquisition unit 103 acquires a predicted traffic amount for the time of performing VN allocation.

Step S104: The physical resource acquisition unit 105 acquires information relating to a physical resource.

Step S105: The service request management unit 104 acquires a service request.

Note that the execution order of steps S102 to S105 above is random.

Step S106: Next, the allocation unit 106 creates restrictive conditions using the service request and the information relating to the physical resources. Then, the allocation unit 106 calculates the optimal VN allocation pattern using the power consumption models, the electricity unit cost for each region and each time, the outside temperature, and the load rates.

Step S107: Next, the setting command unit 107 transmits a VN setting command to each physical resource so as to realize the optimal VN allocation pattern calculated in step S106 above.

According to the above description, the network control apparatus 100 according to an embodiment of the present invention can realize VN allocation that minimizes an electricity fee, with consideration given also to the outside temperature, load rate, time slot, region, and the like. Accordingly, by using the network control apparatus 100 according to the embodiment of the present invention, for example, a telecommunications carrier can realize an even further reduction of OPEX.

Note that although the electricity fee was envisioned as an example of cost in the embodiment of the present invention, there is no limitation thereto, and the present invention can be applied similarly as long as a target function is used which is derived by multiplying the power consumption and a variable that can change for each time and for each region, similarly to the electricity fee unit cost.

For example, a $CO_2$ discharge amount is an example of another cost. The $CO_2$ discharge amount is calculated using the product of the power consumption and the $CO_2$ discharge coefficient. This is because, similarly to the electricity fee unit cost, the $CO_2$ discharge coefficient has a value that differs for each power company, and has regional differences. Note that in general, the $CO_2$ discharge coefficient hardly changes over time and is mostly a fixed value. However, due to the fact that power generation facilities that run are different according to an increase in the need to reduce environmental load and according to the time slot, and the like, it is also thought that the $CO_2$ discharge coefficient will be defined for each time slot in the future. At this time, it is thought that it will be possible to minimize the $CO_2$ discharge amount through application of the present invention, and service provision that appeals to reduction of the environmental load and the like will be achieved.

Hardware Configuration of Network Control Apparatus 100

Figure 5:
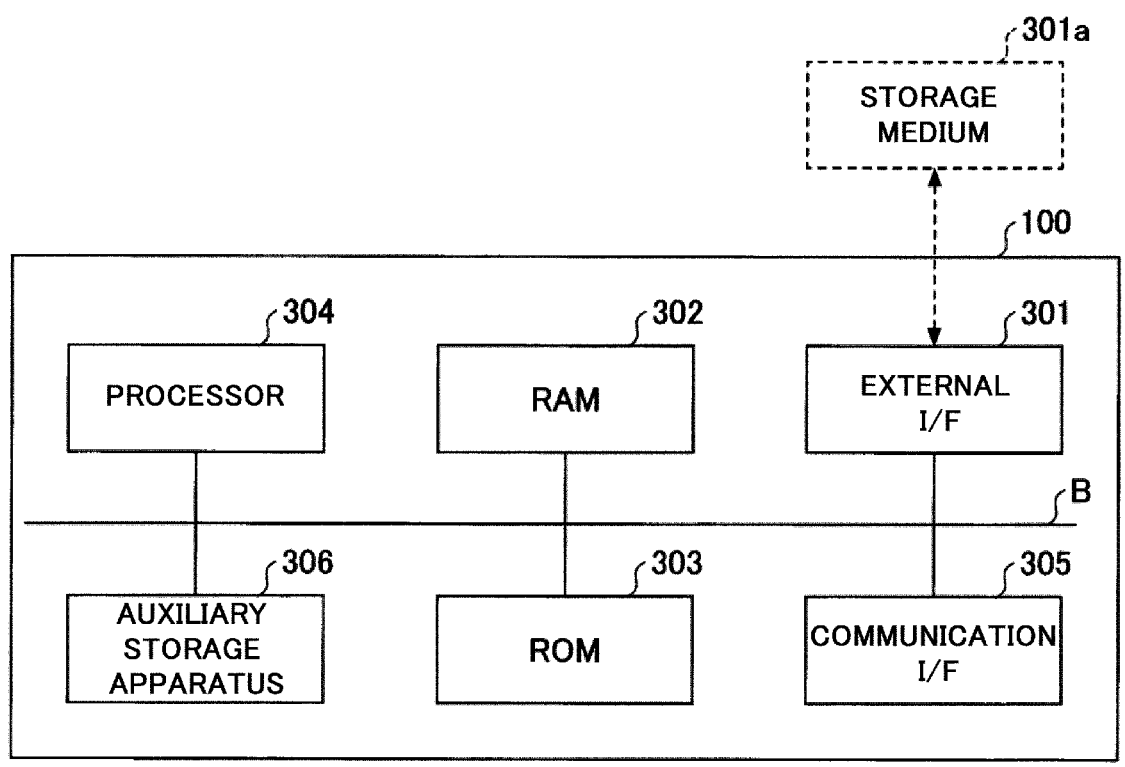
FIG. 5 is a diagram showing an example of a hardware configuration of a network control apparatus according to an embodiment of the present invention.

Finally, the hardware configuration of the network control apparatus 100 according to an embodiment of the present invention will be described with reference to FIG. 5. FIG. 5 is a diagram showing an example of a hardware configuration of the network control apparatus 100 according to an embodiment of the present invention.

As shown in FIG. 5, the network control apparatus 100 according to an embodiment of the present invention includes, as hardware, an external I/F 301, a RAM (Random Access Memory) 302, a ROM (Read Only Memory) 303, a processor 304, a communication I/F 305, and an auxiliary storage apparatus 306. These pieces of hardware are connected to each other so as to be able to communicate via a bus B.

The external I/F 301 is an interface with the external apparatus. A storage medium 301a or the like is an example of the external apparatus. The network control apparatus 100 can perform reading, writing, and the like of the storage medium 301a via the external I/F 301.

Examples of the storage medium 301a include a flexible disk, a CD (compact disc), a DVD (digital versatile disc), an SD memory card (secure digital memory card), or a USB (universal serial bus) memory card.

The RAM 302 is a volatile semiconductor memory that temporarily stores programs and data. The ROM 303 is a non-volatile semiconductor memory that can hold programs and data even if the power source is turned off. The ROM 303 stores, for example, setting information relating to an OS (operating system), setting information relating to a communication network, and the like.

The processor 304 is, for example, a CPU, a GPU (Graphics Processing Unit), or the like, and is a computation apparatus for executing processing by reading out programs and data onto the RAM 302 from the ROM 303, the auxiliary storage apparatus 306, or the like. The functional units (e.g., the schedule management unit 101, the outside temperature acquisition unit 102, the traffic acquisition unit 103, the service request management unit 104, the physical resource acquisition unit 105, the allocation unit 106, the setting command unit 107, etc.) of the network control apparatus 100 according to an embodiment of the present invention are realized through processing for causing the processor 304 to execute one or more programs stored in the auxiliary storage apparatus 306 or the like. Note that these one or more programs may also be stored in, for example, the storage medium 301a.

The communication I/F 305 is an interface for connecting the network control apparatus 100 to the physical network 200.

The auxiliary storage apparatus 306 is, for example, an HDD (Hard Disk Drive), an SSD (Solid State Drive), or the like, and stores various types of programs and data. Examples of the programs and data stored in the auxiliary storage apparatus 306 include an OS, application software for realizing various functions on the OS, and one or more programs for realizing various functional units of a network control apparatus 100 according to an embodiment of the present invention.

The network control apparatus 100 according to an embodiment of the present invention can realize the above-described various types of processing due to having the hardware configuration shown in FIG. 5. Note that in the example shown in FIG. 5, a case was shown in which the network control apparatus 100 of an embodiment of the present invention is realized by one apparatus (computer), but there is no limitation to this, and the network control apparatus 100 may also be realized by multiple apparatuses (computers). The one apparatus (computer) may also include multiple processors 304 and multiple memories (RAM 302, ROM 303, auxiliary storage apparatus 306, etc.). Also, the network control apparatus 100 may include, for example, a display apparatus such as a display, and input apparatuses such as a keyboard and a mouse in addition to the above-described hardware.

The present invention is not limited to the above-described embodiment that was specifically disclosed, and can be modified and changed in various ways without departing from the scope of the claims.

REFERENCE SIGNS LIST

100 Network control apparatus
101 Schedule management unit
102 Outside temperature acquisition unit
103 Traffic acquisition unit
104 Service request management unit
105 Physical resource acquisition unit
106 Allocation unit
107 Setting command unit
108 Model storage unit
109 Electricity fee unit cost storage unit
200 Physical network
301 External I/F
301a Storage medium
302 RAM 303 ROM
304 Processor
305 Communication I/F
306 Auxiliary storage apparatus

The invention claimed is:

1. A control apparatus configured to allocate a virtual network for providing a network service on a physical network, comprising: an acquisition unit, including one or more processors, configured to acquire information indicating an outside temperature of each node included in the physical network, physical resource information of the physical network, information indicating a predicted traffic amount of the physical network, and an allocation request for the virtual network; and an allocation unit, including one or more processors, configured to calculate an optimal allocation of the virtual network using a target function defined using a unit cost defined for each region and for each time slot and a power consumption model taking into consideration the outside temperature and a load rate calculated based on the predicted traffic amount, and a restrictive condition obtained based on the physical resource information and the allocation request.

2. The control apparatus according to claim 1, wherein a link that connects predetermined nodes is included in the physical network, a first model indicating power consumption of each node taking into consideration the outside temperature and the load rate and a second model indicating power consumption of each link taking into consideration the outside temperature and the load rate are included in the power consumption model, and the target function is indicated by the sum of the product of the first model and the unit cost for each node to which the virtual network according to the allocation request is allocated, and the product of the second model and the unit cost for each link to which the virtual network according to the allocation request is allocated.

3. The control apparatus according to claim 2, wherein the restrictive condition is that in each node, the total CPU capacity of the virtual network allocated to the node does not exceed a maximum value of a CPU capacity of the node, and that in each link, the total bandwidth of the virtual network allocated to the link does not exceed a maximum value of a bandwidth of the link.

4. The control apparatus according to claim 1, wherein the control apparatus executes acquisition using the acquisition unit and calculation using the allocation unit each predetermined time interval, and if the time interval is less than or equal to a predetermined time interval, a time average of each unit cost during the time interval is used as the unit cost.

5. The control apparatus according to claim 1, wherein the unit cost is an electricity fee unit cost defined for each region and for each time slot, or a CO2 discharge coefficient defined for each region and for each time slot.

6. A control method, executed by a computer configured to allocate a virtual network for providing a network service on a physical network, comprising: an acquisition procedure of acquiring information indicating an outside temperature of each node included in the physical network, physical resource information of the physical network, information indicating a predicted traffic amount of the physical network, and an allocation request for the virtual network; and a calculation procedure of calculating an optimal allocation of the virtual network using a target function defined using a unit cost defined for each region and for each time slot and a power consumption model taking into consideration the outside temperature and a load rate calculated based on the predicted traffic amount, and a restrictive condition obtained based on the physical resource information and the allocation request.

7. A non-transitory computer readable medium storing a program for causing a computer configured to allocate a virtual network for providing a network service on a physical network to execute: an acquisition procedure of acquiring information indicating an outside temperature of each node included in the physical network, physical resource information of the physical network, information indicating a predicted traffic amount of the physical network, and an allocation request for the virtual network; and a calculation procedure of calculating an optimal allocation of the virtual network using a target function defined using a unit cost defined for each region and for each time slot and a power consumption model taking into consideration the outside temperature and a load rate calculated based on the predicted traffic amount, and a restrictive condition obtained based on the physical resource information and the allocation request.

8. The non-transitory computer readable medium according to claim 7, wherein a link that connects predetermined nodes is included in the physical network, a first model indicating power consumption of each node taking into consideration the outside temperature and the load rate and a second model indicating power consumption of each link taking into consideration the outside temperature and the load rate are included in the power consumption model, and the target function is indicated by the sum of the product of the first model and the unit cost for each node to which the virtual network according to the allocation request is allocated, and the product of the second model and the unit cost for each link to which the virtual network according to the allocation request is allocated.

9. The non-transitory computer readable medium according to claim 8, wherein the restrictive condition is that in each node, the total CPU capacity of the virtual network allocated to the node does not exceed a maximum value of a CPU capacity of the node, and that in each link, the total bandwidth of the virtual network allocated to the link does not exceed a maximum value of a bandwidth of the link.

10. The non-transitory computer readable medium according to claim 7, wherein the stored program causes the computer to execute the acquisition procedure and the calculation procedure each predetermined time interval, and if the time interval is less than or equal to a predetermined time interval, a time average of each unit cost during the time interval is used as the unit cost.

11. The non-transitory computer readable medium according to claim 7, wherein the unit cost is an electricity fee unit cost defined for each region and for each time slot, or a CO2 discharge coefficient defined for each region and for each time slot.

12. The control method according to claim 6, wherein a link that connects predetermined nodes is included in the physical network, a first model indicating power consumption of each node taking into consideration the outside temperature and the load rate and a second model indicating power consumption of each link taking into consideration the outside temperature and the load rate are included in the power consumption model, and the target function is indicated by the sum of the product of the first model and the unit cost for each node to which the virtual network according to the allocation request is allocated, and the product of the second model and the unit cost for each link to which the virtual network according to the allocation request is allocated.

13. The control method according to claim 12, wherein the restrictive condition is that in each node, the total CPU capacity of the virtual network allocated to the node does not exceed a maximum value of a CPU capacity of the node, and that in each link, the total bandwidth of the virtual network allocated to the link does not exceed a maximum value of a bandwidth of the link.

14. The control method according to claim 6, wherein the acquisition procedure and the calculation procedure are executed each predetermined time interval, and if the time interval is less than or equal to a predetermined time interval, a time average of each unit cost during the time interval is used as the unit cost.

15. The control method according to claim 6, wherein the unit cost is an electricity fee unit cost defined for each region and for each time slot, or a $CO_2$ discharge coefficient defined for each region and for each time slot.

* * * * *